United States Patent Office 3,337,630
Patented Aug. 22, 1967

3,337,630
PROCESS FOR THE PURIFICATION OF AMINES
Harold C. Moke, Houston, and Joel M. F. Leathers, Lake Jackson, Tex., assignors to The Dow Chemical Company, Midland, Mich., a corporation of Delaware
No Drawing. Filed July 9, 1962, Ser. No. 208,556
1 Claim. (Cl. 260—583)

This application is a continuation-in-part of our co-pending application Serial No. 694,717, filed Nov. 6, 1957, now abandoned.

The present invention relates to organic amines and more particularly concerns a process for the simultaneous purification and drying of free amines from their reaction medium.

The commercial preparation of organic amines produces relatively dilute solutions containing a large percentage of impurities such as alkali chlorides and aqueous caustic. These impurities are relatively difficult to remove from the amine. Various commercial processes now in use for the purification of the amines, and especially the fractional distillation methods, are laborious and expensive. Many of the amines are heat-sensitive and thus require that subatmospheric pressures be employed when operating in accordance with present-day methods.

It is therefore an object of the present invention to provide a relatively inexpensive process for the purification of amines. It is another object of the present invention to provide a process for the purification and drying of free amines in the liquid state, and at temperatures which require little or no pressure considerations. It is a still further object to provide a single-step process for the purification and drying of free amines whereby the inorganic impurities (i.e., excess caustic and sodium chloride) and water are removed from association with the free amines. Still another object of the present invention is the provision of a continuous process for the purification and drying of free amines. Another advantage of the present process is that anhydrous caustic is not required to be employed in freeing the amine from its hydrochloride. These and other objects will become apparent from the following specification and claim.

It has now been found that the treatment of aliphatic amines with hydrated alkali under certain conditions produces a substantially dry pure free amine. Good results are obtained when employing an amount of alkali feed sufficient to maintain a concentration of about 50 percent alkali in the effluent.

In carrying out the present invention an impure amine made by amination of an alkylene halide (which may or may not be free from its hydrochloride) is fed into tower like zone at a point near the bottom of the tower. Simultaneously, alkali is fed to the tower, at a point above the amine feed point, in order to cause the two feed streams to contact in a countercurrent manner. The purified dry amine is removed from a point near the top of the tower, above the caustic feed, and the alkali and impurities (sodium chloride, alkali and water) are removed at the bottom of the tower. When the amine reaction mixture is employed as a feed (without freeing the amine) the amine is freed from its hydrochloride in the zone. The excess ammonia rinsed from the top of the tower and the free amine and other impurities taken out as afore-described.

The amount of alkali and the concentration thereof fed to the contacting zone is conveniently calculated from the following equation:

$$Y = X \frac{C_3 - C_1 - C_3 A}{C_2 - C_3}$$

lim $C_2 = 70\text{-}55$ percent
lim $C_3 = 50\text{-}65$ percent wherein $C_1$ represents the concentration in percent of the alkali in the impure amine, $C_2$ represents the concentration of the alkali in the alkali feed, $C_3$ represents the concentration of the alkali in the effluent, A represents the concentration of the amine in the impure amine feed, Y represents the pounds of alkali feed, and X represents the pounds of amine feed. Thus, for a given concentration of alkali feed available there can be calculated the amount of alkali necessary to be fed to the process to obtain an effluent which will contain all or substantially all of the alkali, salt and water fed to the process in the various feed streams.

The following examples are illustrative of the present invention but are not to be construed as limiting.

EXAMPLE 1

Having particular reference to the process, an impure amine feed, having a composition of 15 percent by weight of ethylenediamine, 5 percent polyethylene polyamines, 10 percent sodium hydroxide, 30 percent sodium chloride and 40 percent water is fed to a tower or column. Simultaneously, aqueous sodium hydroxide solution, of a concentration of 70 percent by weight sodium hydroxide is fed to the column at a point above the amine feed inlet to the column. The alkali feed is adjusted so that substantially all of the sodium hydroxide and the other impurities of the amine feed (NaCl and water), are removed from a bottom outlet from the column and substantially pure amine is removed from an outlet, above the alkali feed inlet.

The following table lists the feed and effluent compositions at the rates indicated:

| Feed, pounds/hour and composition | | | | Effluent, composition and pounds/hour | | | |
|---|---|---|---|---|---|---|---|
| Amine | | Alkali | | Bottoms | | Top | |
| 100 | 15 Amine.<br>10 NaOH.<br>30 NaCl.<br>40 Water.<br>5 Polyamine. | 150 | 105 NaOH.<br>45 Water. | 230 | 115 NaOH.<br>84.8 Water<br>30 NaCl.<br>0.1 Amine.<br>0.1 Polyamine. | 20 | 14.9 Amine.<br>0.2 Water.<br>4.9 Polyamine. |

Employing similar procedures as set forth in Example 1, substantially similar results were achieved and such results are set forth in the following examples.

EXAMPLE 2

| Feed in pounds/hour | | | | Effluent in pounds/hour | | | |
|---|---|---|---|---|---|---|---|
| Amine Feed | | Alkali Feed | | Bottoms | | Top | |
| 100 | 40 Hexamethylenediamine. 10 NaOH. 40 Water. 10 Salt (NaCl). | 260 | 182 NaOH. 78 H₂O. | 320 | 192 NaOH. 117.2 H₂O. 10 Salt. 0.8 Amine. | 40 | 39.8 Amine. .8 Water. |

EXAMPLE 3

| Feed in pounds/hour | | | | Effluent in pounds/hour | | | |
|---|---|---|---|---|---|---|---|
| Amine Feed | | Alkali Feed | | Bottoms | | Top | |
| 100 | 20 Diethylamine. 10 NaOH. 40 Water. 30 Salt. | 150 | 105 NaOH. 45 H₂O. | 230 | 115 NaOH. 84.6 H₂O. 30 Salt. 4 Amine. | 20 | 19.6 Amine. .4 Water. |

EXAMPLE 4

| Feed in pounds/hour | | | | Effluent in pounds/hour | | | |
|---|---|---|---|---|---|---|---|
| Amine Feed | | Alkali Feed | | Bottoms | | Top | |
| 100 | 30 1,3-propylenediamine. 60 Water. 10 NaCl. | 220 | 154 NaOH. 66 Water. | 290 | 154 NaOH. 125.4 H₂O. .6 Amine. 10.0 NaCl. | 30 | 29.4 Amine. .6 Water. |

EXAMPLE 5

| Feed in pounds/hour | | | | Effluent in pounds/hour | | | |
|---|---|---|---|---|---|---|---|
| Amine Feed | | Alkali Feed | | Bottoms | | Top | |
| 100 | 30 Propylenediamine. 10 Salt. 10 NaOH. 50 H₂O. | 285 | 186 NaOH. 99 H₂O. | 355 | 196 NaOH. 10 Salt. 148.4 H₂O. .6 Amine. | 30 | 29.4 Amine. .6 Water. |

EXAMPLE 6

In order to demonstrate the relationship of this amine separation process to a typical commercial process for the preparation of organic amines the effluent stream from a typical reactor for the preparation of ethylene diamine from ethylene dichloride and ammonia was used. This effluent stream was composed of 388 lbs./hr. of amine hydrochloride, 177 lbs./hr. of water and 425 lbs./hr. of NH₃. The mixture was fed to a flash vessel wherein 1935 lbs./hr. of 70% NaOH was added. The ammonia (425 lbs./hr.) flashed off through an overhead refluxing system and any entrained water or amine, therefore, was returned to the flash vessel. The liquid mixture from the flash vessel was passed to a settling tank where 198 lbs./hr. of pure amine containing 1% water is withdrawn from the top section and 848 lbs./hr. of water, 1150 lbs./hr. of NaOH, 300 lbs./hr. of NaCl and 2 lbs./hr. of amines are withdrawn from the bottom section.

It is to be understood that the removal of caustic, salt and water from ether aliphatic amines, diamines and triamines can be readily and conveniently accomplished in accordance with the process of the present invention. Thus for example, 1,4-butanediamine, 1,5-pentanediamine, dipropylamine, triethylamine and the like may be purified in accordance with process of the present invention.

The amines employed in the present invention can be prepared in accordance with the well known procedures described for example in U.S. Patent 2,028,041.

An alkylene dihalide is reacted with ammonia under pressure and upon completion of the reaction the reaction mixture, either treated with sodium hydroxide to free the diamine from its hydrochloride then introduced into the present process or the amine reaction mixture can be fed directly to the tower of the present process and therein freed, purified and dried. It is understood that anhydrous caustic need not be employed when the amine reaction mixture is treated in the manner herein set forth.

Further, the instant process for purification and drying also can be employed when a catalyst is used as in U.S. 2,020,690. However, no distillation is necessary prior to treatment as herein described.

We claim:

A process for purifying, drying and freeing amines from their hydrochlorides which comprises simultaneously introducing an amine hydrochloride feed and an aqueous 55 to 70 percent by weight sodium hydroxide feed into a zone so as to contact the two feeds in a countercurrent manner, venting ammonia overhead, removing pure amine free from water, caustic and sodium chloride above the point of introduction of the sodium hydroxide feed and withdrawing at the bottom of said zone the impurities water, NaCl, NaOH, while regulating the rate of introduction of said sodium hydroxide feed to maintain a concentration of sodium hydroxide in the aqueous waste effluent of from between about 50 and 65 percent by weight of said effluent.

References Cited
UNITED STATES PATENTS

| | | | |
|---|---|---|---|
| 2,028,041 | 1/1936 | Bersworth | 260—583 |
| 2,922,818 | 1/1960 | Spielberger et al. | 260—583 |

CHARLES B. PARKER, *Primary Examiner.*

J. P. BRUST, *Examiner.*

A. H. SUTTO, *Assistant Examiner.*